United States Patent
Stamos et al.

(10) Patent No.: US 7,825,630 B2
(45) Date of Patent: Nov. 2, 2010

(54) SYSTEMS AND METHODS FOR INTELLIGENT CHARGING AND INTELLIGENT CONDITIONING OF A HIGH VOLTAGE BATTERY

(75) Inventors: Euthemios Nicholas Stamos, Rochester Hills, MI (US); Tobias Glossmann, Troy, MI (US); Christopher Richard Koziara, Oxford, MI (US)

(73) Assignees: Chrysler Group LLC, Auburn Hills, MI (US); Daimler AG, Stuttgart (DE)

( * ) Notice: Subject to any disclaimer, the term of this patent is extended or adjusted under 35 U.S.C. 154(b) by 0 days.

(21) Appl. No.: 12/776,613

(22) Filed: May 10, 2010

(65) Prior Publication Data
US 2010/0214108 A1    Aug. 26, 2010

Related U.S. Application Data

(62) Division of application No. 11/770,137, filed on Jun. 28, 2007, now Pat. No. 7,714,541.

(51) Int. Cl.
*H02J 7/00* (2006.01)

(52) U.S. Cl. .................. 320/132; 320/128; 320/134; 320/106; 324/426

(58) Field of Classification Search .............. None
See application file for complete search history.

(56) References Cited

U.S. PATENT DOCUMENTS

| 7,199,555 B2* | 4/2007 | Hung .................. 320/114 |
| 2006/0214637 A1* | 9/2006 | Gonzales et al. .......... 320/128 |
| 2006/0244423 A1* | 11/2006 | Henningson .............. 320/150 |

* cited by examiner

*Primary Examiner*—Edward Tso
*Assistant Examiner*—Ramy Ramadan
(74) *Attorney, Agent, or Firm*—Ralph E. Smith

(57) ABSTRACT

The technology described herein provides a stand-alone intelligent battery charger and intelligent conditioner for use with a high-voltage battery, such as those used in hybrid automotive vehicles. Additionally, in various exemplary embodiments, this technology provides a system and method for validating the capacity of a high voltage battery. Other comparable uses are also contemplated herein, as will be obvious to those of ordinary skill in the art.

10 Claims, 4 Drawing Sheets

SYSTEMS AND METHODS FOR INTELLIGENT CHARGING AND INTELLIGENT CONDITIONING OF A HIGH VOLTAGE BATTERY

RELATED APPLICATION

This application is a Divisional of U.S. patent application Ser. No. 11/770,137, filed Jun. 28, 2007 now U.S. Pat. No. 7,714,541.

FIELD OF THE INVENTION

The technology described herein relates generally to high voltage batteries, such as, for example, those that are used in hybrid automotive vehicles. More specifically, the technology described herein relates to a portable, stand-alone system and associated method for the intelligent charging and intelligent conditioning of a high voltage battery. Furthermore, the technology described herein relates to a system and method for validating the capacity of a high voltage battery. Other comparable uses are also contemplated herein, as will be obvious to those of ordinary skill in the art.

BACKGROUND OF THE INVENTION

Rechargeable energy storage devices are utilized in hybrid vehicles that are powered by both petroleum-based and electrical-based propulsion systems. These rechargeable energy storage devices include high voltage batteries. When a high voltage battery is unable to provide sufficient power to start a vehicle, an intelligent charger is utilized to recharge the battery. A technician is often required to determine the health of the battery. This includes determining not only the capacity of the battery pack, but also the cell\module voltage differentials.

When the need arises to recharge such a high voltage battery, the known systems and methods are cumbersome. Known systems are limited in their intelligent electronic monitoring, thus increasing safety risks to a user of such a system. Often such systems are bulky and heavy, thus not portable and mobile. Additionally, known systems require the use and integration of some interface device, such as a laptop computer during the intelligent battery charging and conditioning. Furthermore, known systems require special controller area network (CAN) communication software during the intelligent battery charging and conditioning processes. Usually a laptop, or like device, and a power supply is required in which the power supply is set at a peak voltage well below the peak voltage of the battery pack. This process is known as floating. Therefore, a need still exists in the art for such a system and method as the one described herein.

BRIEF SUMMARY OF THE INVENTION

In various exemplary embodiments, the technology described herein provides a portable, stand-alone intelligent battery charger and intelligent conditioner for use with a high-voltage battery, such as those used in hybrid automotive vehicles. Additionally, in various exemplary embodiments, this technology provides a system and method for validating the capacity of a high voltage battery. Other comparable uses are also contemplated herein, as will be obvious to those of ordinary skill in the art.

In one exemplary embodiment, the technology provides a system for the intelligent charging and conditioning of a high voltage propulsion battery to a desired state of charge. The system includes a high voltage source, a battery conditioner, the battery conditioner being powered by the high voltage source and being configured to electrically attach to a high voltage battery and assess a plurality of battery diagnostics, a control interface, the control interface being powered by the high voltage source, a low voltage source, the low voltage source being located within the control interface and providing power to a battery conditioner control and a data logging device, and a power supply and discharge unit, the power supply and discharge unit being located within the battery conditioner and being configured to discharge and charge a high voltage battery to a desired state of charge. The battery conditioner, the control interface, the low voltage source, the data logging device, and the power supply and discharge unit comprise a portable, stand-alone system. The data logging device records high voltage battery data prior, during, and after battery conditioning for engineering analysis and prints a paper receipt of logged activities. The data also is stored for later analysis. For example, the data is later extracted via a connected laptop.

The system is coupled to a high voltage battery to charge the high voltage battery to a desired state of charge. Optionally, the system is coupled to a high voltage battery, the battery being located in a hybrid or electric vehicle to charge the high voltage battery to a desired state of charge and start the vehicle. The system, however, is not limited to the situation where a battery is unable to start a vehicle.

The system further includes a user interface, the user interface including a display screen and being configured to provide a user with battery diagnostic data, battery conditioner data, and state of charge data. The data is displayed to the user prior, during, and after battery conditioning. Optionally, the user interface further includes an audible warning system, wherein the audible warning system informs a user of a critical battery status.

The system further includes updatable logic configured to auto-recognize a high voltage battery, safeguard against exceeding limitations of the high voltage battery, and use controller area network (CAN) parameters and/or diagnostic parameters for battery conditioning algorithms. The updatable logic is further configured to charge a high voltage battery to a predetermined nominal state of charge. The updatable logic is further configured to charge a high voltage battery to a predetermined exact state of charge. Thus, the system is used to achieve either a nominal state of charge or an exact state of charge, in this embodiment.

In another exemplary embodiment, the technology provides a method for the intelligent charging and conditioning of a high voltage propulsion battery to a desired state of charge. The method includes utilizing a high voltage load source\discharge unit, attaching a battery conditioner to a high voltage battery; the battery conditioner being powered by the high voltage source and being configured to electrically attach to a high voltage battery and assess a plurality of battery diagnostics, utilizing a control interface; the control interface being powered by the high voltage source, utilizing a low voltage source; the low voltage source being located within the control interface and providing power to a battery conditioner control and a data logging device (the control architecture for the battery), utilizing a power supply and discharge unit, the power supply and discharge unit being located within the battery conditioner and being configured to discharge and charge a high voltage battery to a desired state of charge, displaying a plurality of internal diagnostics of the high voltage battery, and determining whether a user desires a quick charge of the high voltage battery.

In one exemplary embodiment, the method further includes selecting a quick charge of the high voltage battery, determining a target state of charge, charging or discharging the high voltage battery until the target state of charge has been reached, checking, with the battery conditioner, for a rational relationship between the target state of charge and a battery management system located within the high voltage battery, and displaying the battery conditioner's cycle data.

In another exemplary embodiment, the method further includes selecting whether to seek a target state of charge to cycle the high voltage battery, upon selecting to seek a target state of charge, determining, by the battery conditioner, the target state of charge, selecting whether the state of charge desired is to be nominal or exact, upon selecting an exact state of charge, discharging the high voltage battery to a lower voltage threshold, charging the high voltage battery to an upper voltage threshold, discharging the high voltage battery to the target state of charge determined by the battery conditioner, checking, with the battery conditioner, for a rational relationship between the target state of charge and a battery management system located within the high voltage battery, and displaying the battery conditioner's cycle data.

In yet another exemplary embodiment, the method further includes selecting whether to seek a target state of charge to cycle the high voltage battery, upon selecting to seek a target state of charge, determining, by the battery conditioner, the target state of charge, selecting whether the state of charge desired is to be nominal or exact, upon selecting a nominal state of charge, discharging the high voltage battery cell\module or pack to a lower voltage threshold, charging the high voltage battery to a state of charge as indicated by a battery management system located within the high voltage battery, checking, with the battery conditioner, for a rational relationship between the target state of charge and the battery management system located within the high voltage battery, and displaying the battery conditioner's cycle data.

In yet another exemplary embodiment, the method further includes selecting whether to seek a target state of charge to cycle the high voltage battery, upon selecting to cycle the high voltage battery, discharging the high voltage battery to a lower voltage threshold, discharging the high voltage battery to a lower voltage threshold, charging the high voltage battery to an upper voltage threshold, repeating the discharging and charging processes, discharging the high voltage battery to a target state of charge determined by the battery conditioner, checking, with the battery conditioner, for a rational relationship between the target state of charge and the battery management system located within the high voltage battery, and displaying the battery conditioner's cycle data.

In still yet another exemplary embodiment, the method further includes utilizing updatable logic configured to auto-recognize a high voltage battery, safeguard against exceeding limitations of the high voltage battery, and use controller area network (CAN) parameters and/or diagnostic parameters for battery conditioning algorithms.

In still yet another exemplary embodiment, the method further includes utilizing a user interface, the user interface comprising a display screen and being configured to provide a user with battery diagnostic data, battery conditioner data, and state of charge data, and wherein the data is displayed to the user prior, during, and after battery conditioning. Optionally, the user interface further includes an audible warning system, wherein the audible warning system informs a user of a critical battery status.

In still yet another exemplary embodiment, the method further includes recording, by the data logging device, high voltage battery data prior, during, and after battery conditioning for engineering analysis, and printing a paper receipt of logged activities.

In still yet another exemplary embodiment, wherein the high voltage battery is a propulsion battery in a hybrid or electric vehicle, and wherein the battery conditioner, the control interface, the low voltage source, the data logging device, and the power supply and discharge unit comprise a portable, stand-alone unit, the method further includes coupling the battery conditioner and the power supply and discharge unit to the high voltage battery within the vehicle, charging the high voltage battery to a state of charge such that the vehicle is capable of being started, decoupling the battery conditioner and the power supply and discharge unit from the high voltage battery within the vehicle, and starting the vehicle.

Advantageously, the stand-alone battery charger and conditioner provides better portability and mobility over known systems in the art. Additionally, the stand-alone battery charger and conditioner provides increased safety to a user with the automatic shut-off of intelligent charging and conditioning once defined exit conditions are met. Furthermore, the stand-alone battery charger and conditioner provides for the automatic adaptation to various types and/or manufacturers of high voltage battery packs.

There has thus been outlined, rather broadly, the features of the technology in order that the detailed description that follows may be better understood, and in order that the present contribution to the art may be better appreciated. There are additional features of the technology that will be described and which will form the subject matter of the claims. Additional aspects and advantages of the technology will be apparent from the following detailed description of an exemplary embodiment which is illustrated in the accompanying drawings. The technology is capable of other embodiments and of being practiced and carried out in various ways. Also, it is to be understood that the phraseology and terminology employed are for the purpose of description and should not be regarded as limiting.

BRIEF DESCRIPTION OF THE DRAWINGS

The technology is illustrated and described herein with reference to the various drawings, in which like reference numbers denote like method steps and/or system components, respectively, and in which.

DETAILED DESCRIPTION OF THE INVENTION

Before describing the disclosed embodiments of the technology in detail, it is to be understood that the technology is not limited in its application to the details of the particular arrangement shown here since the technology is capable of other embodiments. Also, the terminology used herein is for the purpose of description and not of limitation.

In various exemplary embodiments, the technology described herein provides a portable, stand-alone intelligent battery charger and intelligent conditioner for use with a high-voltage battery, such as those used in hybrid automotive vehicles. Additionally, in various exemplary embodiments, this technology provides a system and method for validating the capacity of a high voltage battery. Other comparable uses are also contemplated herein, as will be obvious to those of ordinary skill in the art.

Figure 1:
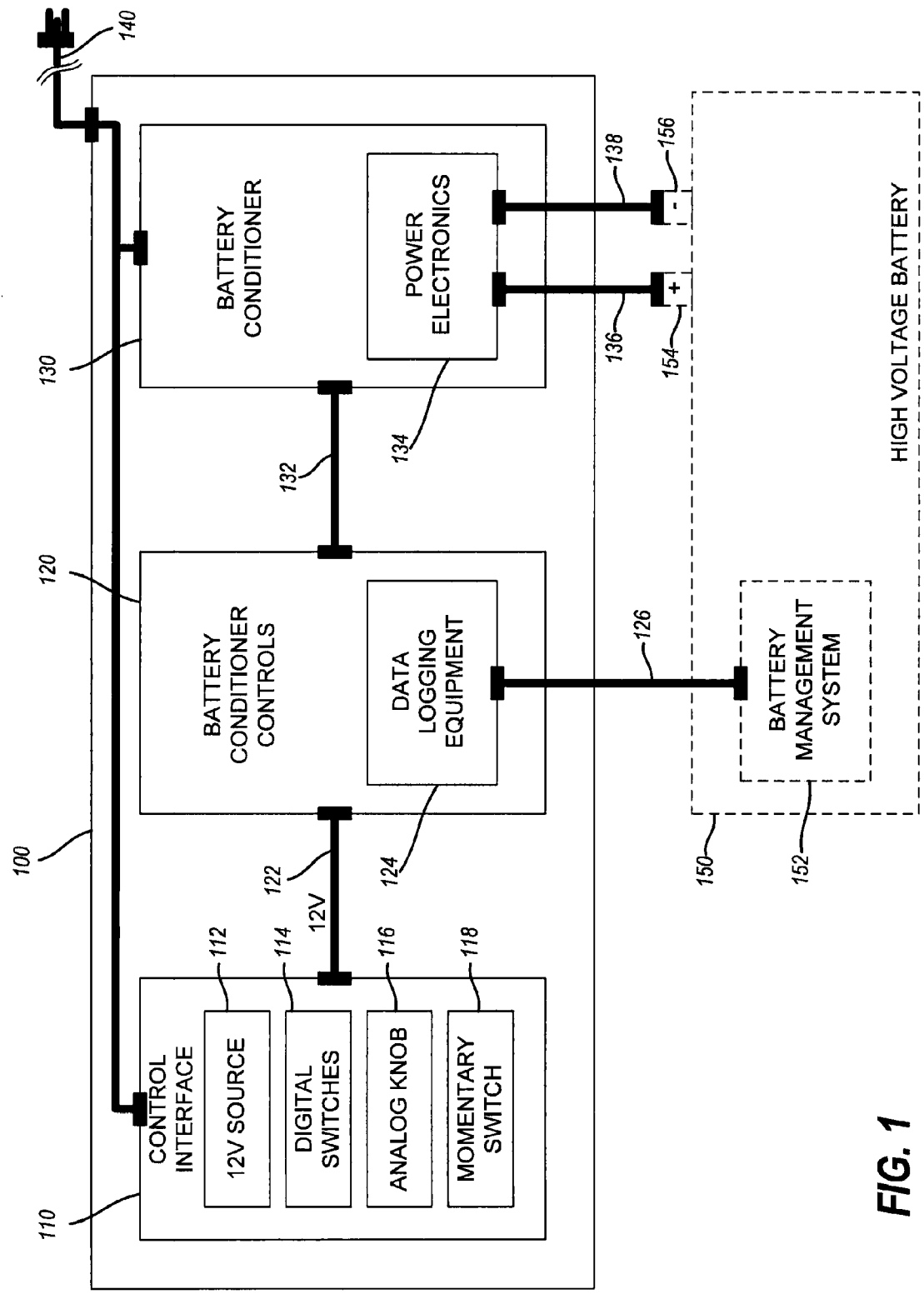
FIG. 1 is a schematic diagram of a stand-alone battery charger and conditioner, according to an embodiment of this technology, illustrating, in particular, the control interface, battery conditioner controls and data logging equipment, battery conditioner, and shown in use with a high voltage battery and its battery management system.

Referring now to FIG. 1, a stand-alone battery charger and conditioner system 100 is shown according to an embodiment of this technology. The stand-alone battery charger and conditioner system 100 is used to charge or discharge a battery, such as one used in a hybrid or electric vehicle, to a desired level.

The stand-alone battery charger and conditioner system 100 includes a high voltage source 140. The system 100 design is flexible such that the high voltage source 140 may be 110V 60 Hz or 240V 50 Hz. Additionally, the high voltage source 140 is automatically detected by the system 100. For the 12 Volt source 112, this automatic detection is performed by standard electronics, known in the art, at the transformer level. For the high voltage source 140, the benefit of plugging into a higher voltage provides a higher current capability. For example, one obtains more power from 240 Volts at 10 Amps than from 120 Volts at 10 Amps. Thus, the quick charge option is even better.

The stand-alone battery charger and conditioner system 100 includes a control interface 110. The stand-alone battery charger and conditioner system 100 includes a battery conditioner 130 and battery conditioner controls 120. The control interface 110 provides a 12V source 112 to the battery conditioner 130 and battery conditioner controls 120. Additionally, the control interface 110 provides digital switches 114, an analog knob 116, and a momentary switch 118. Each of these is a physical input with which a user makes a decision. Alternative controls methods are available. In this example, however, the digital switch 114 is a switch to turn on or off certain portions of the stand-alone battery charger and conditioner system 100. The analog knob 116 is a knob with which to dial in parameters. The momentary switch 118 performs similar functionality as the digital switch 114 but using a momentary switch. The control interface 110 is electrically coupled with a coupler 122 to the battery conditioner controls 120. The battery conditioner controls 120 are electrically coupled with a coupler 132 to the battery conditioner 130.

The battery conditioner controls 120 also include data logging equipment 124. The data logging equipment 124 is, while in use with a high voltage battery, electrically coupled with coupler 126 to a high voltage battery 150 and its battery management system 152.

The battery conditioner 130 further includes power electronics 134 including a power supply and discharge unit. The power supply and discharge unit are configured to discharge and/or charge a high voltage battery 150 to a desired state of charge. The power electronics 134 are, when in use with a high voltage battery 150, electrically coupled with couplers 136, 138 to the positive and negative leads 154, 156 of the high voltage battery 150.

The stand-alone battery charger and conditioner system 100 is portable and utilizes the battery conditioner 130, the control interface 110, the low voltage source 112, the data logging equipment 124, and power electronics 134 as a stand-alone system for ease of use.

The battery management system 152 of the high voltage battery 150 provides automatic adaptation to various types and/or manufacturers of high voltage battery packs. The battery management system 152 provides the diagnostic information over the CAN line 126 to the conditioner controls 120. The conditioner controls 120 then recognize or reject the battery pack 150, depending on whether the charger has been programmed for use with that battery 150. The battery utilizes either primary or secondary targeting (i.e., nominal or exact state of charge (SOC)). The SOC from the battery management system 152 is treated as the primary SOC. The secondary SOC is the exact SOC, determined by capacity. If the battery 150 has been manufactured properly, by the end of the capacity verification, the SOC from the battery management system 152 should match the exact capacity. The stand-alone battery charger and conditioner system 100 allows a user to select a desired state of charge for testing. This battery charger and conditioner system 100 is not limited to the nominal capacity (as utilized by the battery management system 152) but also can provide a real capacity determination. Additionally, the battery charger and conditioner system 100 determines the general and/or specific health of the high voltage battery. The systems known in the art require a portable computer device, or the like, used in combination with the battery charger to provide a state of charge to a battery. This battery charger and conditioner system 100 does not require a portable computer device, or the like.

The stand-alone battery charger and conditioner system 100 is useful in vehicle development and engineering. The system 100 allows a point setting of an exact state of charge prior to a test and provides the state of charge after a test. Additionally, the stand-alone battery charger and conditioner system 100 is used in service. The system 100 is used to revive a discharged battery (for example, a battery to weak to crank the vehicle). The system 100 is used to determine if a high voltage battery is in "good health," such as validating whether the battery is healthy enough to be used, validating (or denying) warranty claims, servicing a battery that has been in storage for an extended period of time, and displaying or printing battery warranty data.

Figure 2:
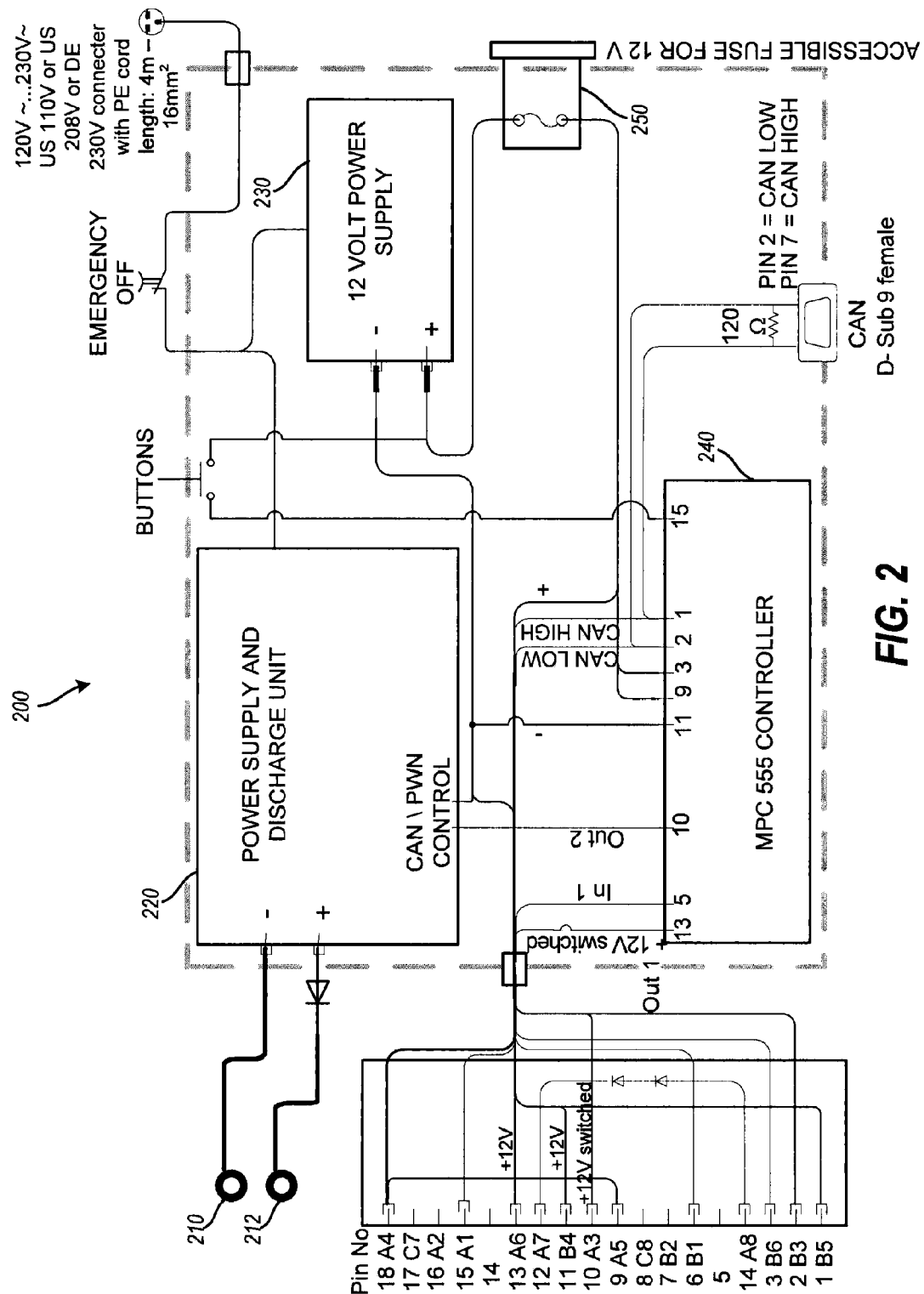
FIG. 2 is a schematic wiring diagram of a stand-alone battery charger and conditioner, according to an embodiment of this technology, illustrating, in particular, the power supply and discharge unit, 12V power supply, controller, intermediate connector, accessible fuse for 12V, emergency shut-off, input voltage connector, controller area network bus, and battery access cables.

Referring now to FIG. 2, a schematic wiring diagram 200 of a stand-alone battery charger and conditioner 100 of FIG. 1, according to one example embodiment of this technology, is shown. Cables 210, 212 provide electrical connectivity between a high voltage battery (not shown) and the power supply and discharge unit 220. The stand-alone battery charger and conditioner 100 provides a 12V power supply 230 and includes an accessible fuse for 12V 250. The stand-alone battery charger and conditioner 100 is shown with a MPC 555 controller 240; however, as known in the art other suitable controllers may be used in alternative embodiments.

Figure 3:
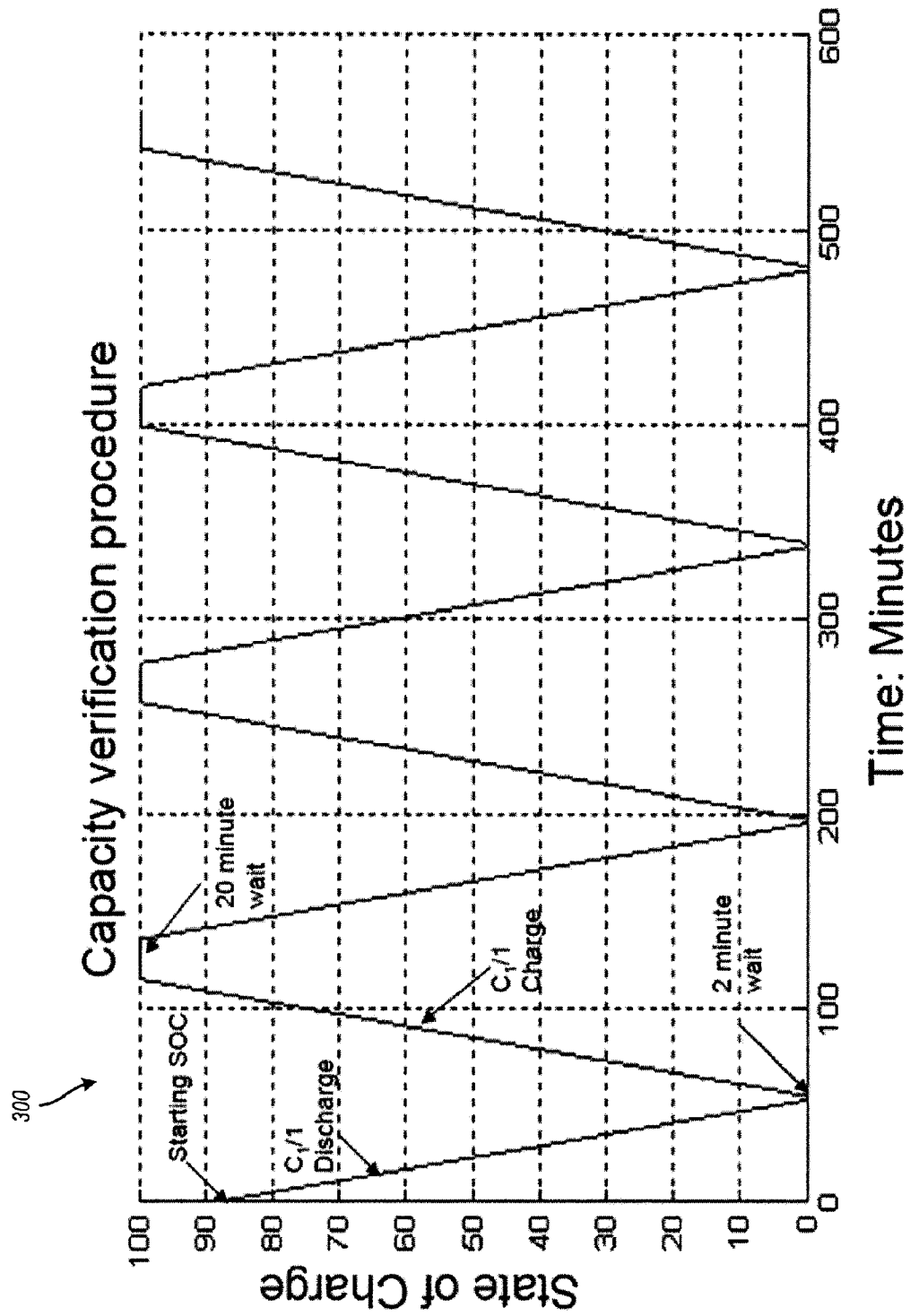
FIG. 3 is a diagram illustrating the battery capacity verification procedure with a plot of the state of charge of the battery over time, according to an embodiment of this technology, illustrating, in particular, the starting state of charge, first discharge, charge, and second discharge.

Referring now to FIG. 3, a diagram 300 illustrating the battery capacity verification procedure is shown. The diagram 300 illustrates the state of charge of the battery over time, illustrating in particular, the starting state of charge, first discharge, charge, second discharge, and wait periods. The conditioner is not limited to this process. This is, however, an exemplary embodiment.

Figure 4:
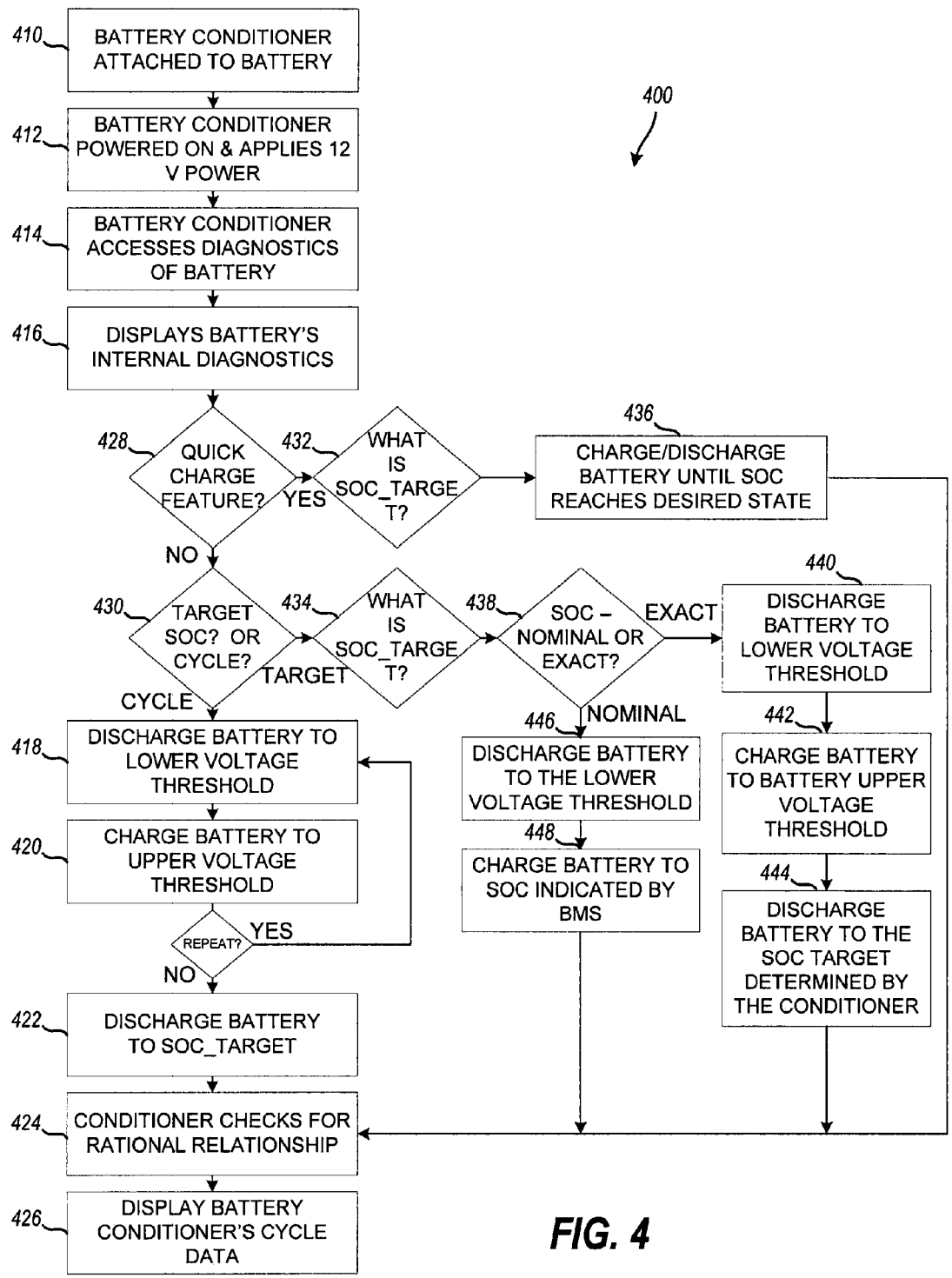
FIG. 4 is a flowchart diagram illustrating a method, according to an embodiment of the technology, for accessing diagnostics of a battery being tested, determining whether a quick charge is desired or a state of charge level is desired, discharging the battery, charging the battery, and displaying the battery conditioner's cycle data.

Referring now to FIG. 4, a flowchart diagram 400 illustrating various methods for the intelligent charging and conditioning of a high voltage propulsion battery to a desired state of charge is shown. One method for the intelligent charging and conditioning of a high voltage propulsion battery includes utilizing a high voltage source, attaching a battery conditioner to a high voltage battery 410, the battery conditioner being powered by the high voltage source and being configured to electrically attach to a high voltage battery and assess a plurality of battery diagnostics, powering on the battery conditioner and applying 12V power 412, utilizing a control interface, the control interface being powered by the high voltage source, utilizing a low voltage source, the low voltage source being located within the control interface and providing power to a battery conditioner control and a data logging device, utilizing a power supply and discharge unit, the power supply and discharge unit being located within the battery conditioner and being configured to discharge and charge a high voltage battery to a desired state of charge, using the battery conditioner to assess the diagnostics of the battery 414, displaying a plurality of internal diagnostics of the high voltage battery 416, and determining whether a user desires a quick charge of the high voltage battery 428.

Assuming that a user opts for a quick charge to the high voltage battery, the method next includes determining 432 a target state of charge, charging 436 or discharging the high voltage battery until the target state of charge has been reached, checking 424, with the battery conditioner, for a rational relationship between the target state of charge and a battery management system located within the high voltage battery, and displaying 426 the battery conditioner's cycle data.

Assuming that a user opts to not select a quick charge to the high voltage battery, the method next includes determining 430 whether to seek a target state of charge to cycle the high voltage battery. Upon selecting, in step 430, to seek a target state of charge, the method next includes determining 434, by the battery conditioner, the target state of charge and then selecting 438 whether the state of charge desired is to be nominal or exact. Upon selecting, in step 438, an exact state of charge, the method next includes discharging 440 the high voltage battery to a lower voltage threshold, charging 442 the high voltage battery to an upper voltage threshold, discharging 444 the high voltage battery to the target state of charge determined by the battery conditioner, checking 424, with the battery conditioner, for a rational relationship between the target state of charge and a battery management system located within the high voltage battery, and displaying 426 the battery conditioner's cycle data.

However, upon selecting, in step 438, a nominal state of charge, the method next includes discharging 446 the high voltage battery to a lower voltage threshold, charging 448 the high voltage battery to a state of charge indicated by the battery management system of the high voltage battery, checking 424, with the battery conditioner, for a rational relationship between the target state of charge and a battery management system located within the high voltage battery, and displaying 426 the battery conditioner's cycle data.

If, however, in step 430, a user selects to cycle the high voltage battery, the method next includes discharging 418 the high voltage battery to a lower voltage threshold, charging 420 the high voltage battery to an upper voltage threshold, repeating the discharging and charging processes three times, for example, discharging 422 the high voltage battery to a target state of charge determined by the battery conditioner, checking 424, with the battery conditioner, for a rational relationship between the target state of charge and the battery management system located within the high voltage battery, and displaying 426 the battery conditioner's cycle data.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology and are intended to be covered by the following claims.

What is claimed is:

1. A method for a system of intelligent charging and conditioning of a high voltage battery to a desired state of charge, the method comprising:

utilizing a high voltage source;

attaching a battery conditioner to a high voltage battery; the battery conditioner being powered by the high voltage source and being configured to electrically attach to a high voltage battery and assess a plurality of battery diagnostics, the battery conditioner further being operable to automatically determine whether the high voltage is compatible with the intelligent charging and conditioning system;

utilizing a control interface; the control interface being powered by the high voltage source;

utilizing a low voltage source; the low voltage source being located within the control interface and providing power to a battery conditioner control and a data logging device;

utilizing a power supply and discharge unit, the power supply and discharge unit being located within the battery conditioner and being configured to discharge and charge a high voltage battery to a desired state of charge;

displaying a plurality of internal diagnostics of the high voltage battery; and determining whether a user desires a quick charge of the high voltage battery.

2. The method for the intelligent charging and conditioning of a high voltage battery to a desired state of charge of claim 1, the method further comprising:

selecting a quick charge of the high voltage battery;

determining a target state of charge;

charging or discharging the high voltage battery until the target state of charge has been reached;

checking, with the battery conditioner, for a rational relationship between the target state of charge and a battery management system located within the high voltage battery;

displaying the battery conditioner's cycle data; and displaying a plurality of health parameters of the battery.

3. The method for the intelligent charging and conditioning of a high voltage battery to a desired state of charge of claim 1, the method further comprising:

selecting whether to seek a target state of charge to cycle the high voltage battery;

upon selecting to seek a target state of charge, determining, by the battery conditioner, the target state of charge;

selecting whether the state of charge desired is to be nominal or exact;

upon selecting an exact state of charge, discharging the high voltage battery to a lower voltage threshold;

charging the high voltage battery to an upper voltage threshold;

discharging the high voltage battery to the target state of charge determined by the battery conditioner;

checking, with the battery conditioner, for a rational relationship between the target state of charge and a battery management system located within the high voltage battery;
displaying the battery conditioner's cycle data; and
displaying a plurality of health parameters of the battery.

4. The method for the intelligent charging and conditioning of a high voltage battery to a desired state of charge of claim 1, the method further comprising:
selecting whether to seek a target state of charge to cycle the high voltage battery;
upon selecting to seek a target state of charge, determining, by the battery conditioner, the target state of charge;
selecting whether the state of charge desired is to be nominal or exact;
upon selecting a nominal state of charge, discharging the high voltage battery to a lower voltage threshold;
charging the high voltage battery to a state of charge as indicated by a battery management system located within the high voltage battery;
checking, with the battery conditioner, for a rational relationship between the target state of charge and the battery management system located within the high voltage battery;
displaying the battery conditioner's cycle data; and
displaying a plurality of health parameters of the battery.

5. The method for the intelligent charging and conditioning of a high voltage battery to a desired state of charge of claim 1, the method further comprising:
selecting whether to seek a target state of charge to cycle the high voltage battery;
upon selecting to cycle the high voltage battery, discharging the high voltage battery to a lower voltage threshold;
discharging the high voltage battery to a lower voltage threshold;
charging the high voltage battery to an upper voltage threshold;
repeating the discharging and charging processes;
discharging the high voltage battery to a target state of charge determined by the battery conditioner;
checking, with the battery conditioner, for a rational relationship between the target state of charge and the battery management system located within the high voltage battery;
displaying the battery conditioner's cycle data; and
displaying a plurality of health parameters of the battery.

6. The method for the intelligent charging and conditioning of a high voltage battery to a desired state of charge of claim 1, the method further comprising:
utilizing updatable logic configured to:
safeguard against exceeding limitations of the high voltage battery;
use controller area network (CAN) parameters and/or diagnostic parameters for battery conditioning algorithms; and
displaying a plurality of health parameters of the battery.

7. The method for the intelligent charging and conditioning of a high voltage battery to a desired state of charge of claim 1, the method further comprising:
utilizing an audible warning system, wherein the audible warning system informs a user of a critical battery status.

8. The method for the intelligent charging and conditioning of a high voltage battery to a desired state of charge of claim 1, the method further comprising:
recording, by the data logging device, high voltage battery data prior, during, and after battery conditioning for engineering analysis;
printing a paper receipt of logged activities; and
displaying a plurality of health parameters of the battery.

9. The method for the intelligent charging and conditioning of a high voltage battery to a desired state of charge of claim 1, the method further comprising:
utilizing a user interface, the user interface comprising a display screen and being configured to provide a user with battery diagnostic data, battery conditioner data, and state of charge data, displaying a plurality of health parameters of the battery, and wherein the data is displayed to the user prior, during, and after battery conditioning.

10. The method for the intelligent charging and conditioning of a high voltage battery to a desired state of charge of claim 1, wherein the high voltage battery is a propulsion battery in a hybrid or electric vehicle, and wherein the battery conditioner, the control interface, the low voltage source, the data logging device, and the power supply and discharge unit comprise a portable, stand-alone unit, the method further comprising:
coupling the battery conditioner and the power supply and discharge unit to the high voltage battery within the vehicle;
charging the high voltage battery to a state of charge such that the vehicle is capable of being started;
decoupling the battery conditioner and the power supply and discharge unit from the high voltage battery within the vehicle;
starting the vehicle.

* * * * *